(No Model.)

R. S. BUCK.
TAPE HOLDER.

No. 580,609. Patented Apr. 13, 1897.

Witnesses
E. E. Ellis
E. Harrener

Inventor
Richard S. Buck
By John Freeman
Attorneys

THE NORRIS PETERS CO., PHOTO-LITHO., WASHINGTON, D. C.

UNITED STATES PATENT OFFICE.

RICHARD S. BUCK, OF SUSPENSION BRIDGE, NEW YORK.

TAPE-HOLDER.

SPECIFICATION forming part of Letters Patent No. 580,609, dated April 13, 1897.

Application filed June 1, 1896. Serial No. 593,910. (No model.)

*To all whom it may concern:*

Be it known that I, RICHARD S. BUCK, a citizen of the United States, residing at Suspension Bridge, in the county of Niagara and State of New York, have invented certain new and useful Improvements in Tape-Holders, of which the following is a specification.

My invention relates to measuring-tape holders; and it has for its object to improve the construction and arrangement of said tapes, whereby accurate measurements can be produced; and to these ends it consists in the various features of construction and arrangement of parts substantially as hereinafter more particularly set forth.

Figure 1:
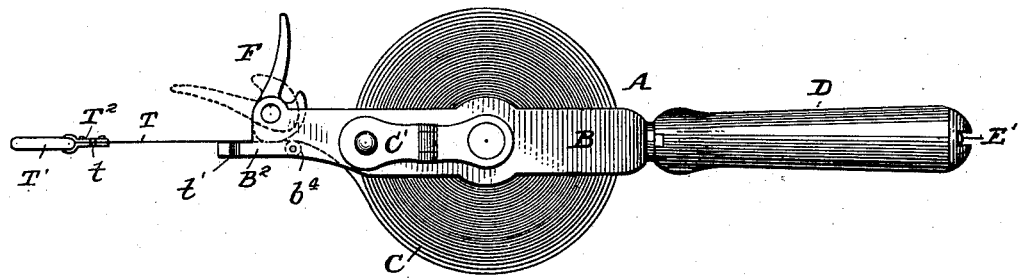
Figure 2:
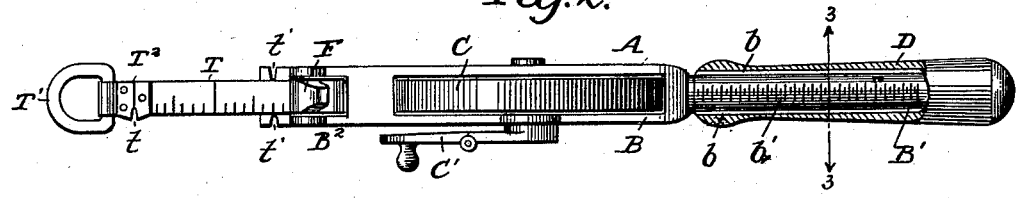
Figure 3:
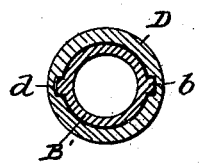
Figure 4:
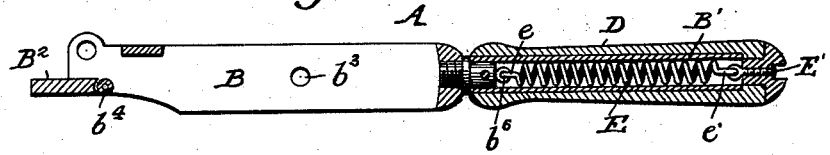

Referring to the accompanying drawings, wherein I have illustrated one preferred form or embodiment of my invention, Figure 1 is a side view of the measuring-tape holder. Fig. 2 is a plan view, partly in section. Fig. 3 is a vertical transverse section on the line 3 3, Fig. 2; and Fig. 4 is a vertical longitudinal section of Fig. 1, the tape reel and spool being omitted.

While the general principles of my invention hereinafter set forth may be applied in many and various ways and to different constructions, according to the purposes and objects for which it is especially intended, I have illustrated herein a preferred embodiment which will be sufficient to enable others to make use of my invention and apply the principles thereof in the manner desired. I have shown it applied to a steel tape such, for instance, as is commonly used by surveyors and engineers, and, while it is intended more particularly for such use, of course it can be adapted to other uses, as far as it is applicable thereto, without departing from the spirit of my invention.

It is well known that when a tape or other measuring device is stretched between two points it is practically impossible to maintain it in an absolutely straight line, as it assumes what is known as a "catenary" curve, which interferes more or less with absolute accuracy in measurement. This curve depends, other things being equal, upon the tension put upon the tape or measuring device, and for a tape of a given length under a given tension it is always the same, so that by applying the same tension to such a tape absolutely the same measurements may always be made and the usual errors avoided.

To accomplish this result, my invention consists, broadly stated, in the combination, with a tape or other distance-measuring device, of a weight-measuring device, such, for instance, as a spring-balance, and this may be applied in any desired manner, but preferably substantially as hereinafter set forth.

Other features of invention relate to auxiliary devices whereby the tape or measuring device may be put under tension and whereby plumb-lines may be applied to the device, &c., as will more fully appear hereinafter.

With this general statement of my invention I will now describe the specific embodiment shown in the drawings, in which A represents what may be termed the "tape-holder," comprising a frame B, which may be of metal or other suitable material and which is bifurcated or recessed to receive a tape-reel C, and which is provided with an extension $B'$, adapted to fit a handle D, the extension being hollow, as shown clearly in Fig. 3, and being provided with some suitable guides, as the ribs $b$, fitting corresponding grooves $d$ in the handle D, or a pin made fast to the handle D and let into a longitudinal slot in the frame B, and, further, being provided with a suitable scale $b'$. A preferred way of making this framework is illustrated in Fig. 4, in which it is made in several parts joined together in an obvious manner, and it will be seen that the handle D is fitted to slide loosely and accurately on the extension $B'$, and inside of the extension $B'$ is a spring-balance E, one end of which, as $e$, is secured to an eye $b^6$, attached to the frame B, and the other end of which, $e'$, is secured to an adjusting screw-eye $E'$, arranged in the outer end of the handle.

The tape-reel C may be of any usual or desired construction and is shown as mounted in bearings $b^3$ in the sides of the frame and as being provided with the usual folding reel-handle $C'$ on the outside of the frame, by means of which it can be operated, although of course any other reel or means for operating it may be substituted, according to the character of the line used. The frame is also provided at one end with a bearing-surface $B^2$, over which the tape T passes and on which it may be supported, and it is desirable to provide a friction-roll $b^4$ to serve as an additional guide for the tape.

Mounted in the frame or connected therewith is some suitable means for securing the tape to the frame after it has been paid out, and I have shown as mounted between the sides of the frame a cam-shaped clamp F, (best shown in Fig. 1,) by which it will be seen that it can be tilted in a position to allow the tape to move freely from the reel or can be tilted into the position shown in full lines, so as to tightly hold the tape against the frame at the desired point.

The tape T may be of any usual or desired construction, preferably of steel, having a link T', by means of which the end can be fastened to any suitable support or connection, and it is also provided with a projection $T^2$, fast to the end of the tape, say at an inch from its extremity or other position, which is provided with a slot $t$, from which can be supported a plumb-bob. The adjacent end of the frame B is also provided at a point beyond the clamp with slots $t'$, from which also a plumb-bob may be suspended, and there is preferably a slot on each side extending practically to the edge of the tape, so as to furnish a fixed point or points from which the plumb-bob may be suspended.

Such being in general the preferred construction of the device, some of its various uses will be apparent. For instance, in measuring relatively long distances, the link T' being secured to some stationary support, the tape is paid out to the required length and is then secured to the frame by the friction-clamp F, and if this length is of any considerable amount there will be more or less of a departure from a straight line in the extension of the tape, and the degree of departure will depend upon the tension put upon the tape. If now the operator puts the tape under a certain tension by drawing on the handle until the indicator or scale $b'$ shows a certain pressure on the spring-balance—as, for instance, twenty pounds—the exact distance desired can be measured, and if a plumb-bob is suspended from the lateral slot or slots $t'$ its exact position can be located, and this can be done repeatedly, so that a line of any distance—say, for instance, a hundred feet—can be measured accurately every time by putting the tape under the same tension. Of course it will be understood that the degree of tension applied to the tape will vary with the length thereof, and the relative tension to the distance measured can be readily determined by the operator, and it is unnecessary to point out herein any further uses to which the device can be applied. It will be observed, however, that the device is simple of structure and can be readily made and put together and is not liable to get out of order, and that it is convenient for use and is well adapted for the purposes intended.

It is manifest that the details of construction may be varied—as, for instance, instead of the grooves in the handle D and ribs on the extension B' the latter may be slotted longitudinally and a pin made fast to the handle D may enter the slot to act as a guide. The slots $t\ t'$ on the tape and tape-holder are important and useful whether the spring-balance is used or not, as they furnish fixed points in relation to the tape from which to suspend plumb-bobs and thereby obviate great inconvenience and a fruitful source of error in having to hold the plumb-bob string at exactly the right point on the tape without the assistance of such a device.

What I claim is—

1. In a measuring device, the combination with the frame, of an extension to the frame, a handle applied to the extension, and a spring connected to the frame and handle, substantially as described.

2. In a measuring device, the combination with the frame carrying the reel, of a hollow extension having a scale thereon, a hollow handle embracing the extension, and a spring arranged in the extension and connected to the frame and handle, substantially as described.

3. In a measuring device, the combination with the frame and reel, of a friction-clamp, and a spring-balance connected as a handle to the frame, substantially as described.

In testimony whereof I have signed my name to this specification in the presence of two subscribing witnesses.

R. S. BUCK.

Witnesses:
JAMES LOW,
J. A. FAIRLEIGH.